(12) United States Patent
Bogin et al.

(10) Patent No.: US 6,192,455 B1
(45) Date of Patent: Feb. 20, 2001

(54) APPARATUS AND METHOD FOR PREVENTING ACCESS TO SMRAM SPACE THROUGH AGP ADDRESSING

(75) Inventors: Zohar Bogin, Folsom; Vincent E. VonBokern, Rescue, both of CA (US)

(73) Assignee: Intel Corporation, Santa Clara, CA (US)

( * ) Notice: Under 35 U.S.C. 154(b), the term of this patent shall be extended for 0 days.

(21) Appl. No.: 09/050,627

(22) Filed: Mar. 30, 1998

(51) Int. Cl.[7] .................................................. G06F 12/00
(52) U.S. Cl. ..................... 711/154; 711/163; 711/147; 711/202; 711/206; 711/209; 711/152; 710/260; 712/229; 345/520; 345/521
(58) Field of Search ..................................... 711/154, 147, 711/202, 206, 209, 163, 152; 710/260; 712/229; 345/520, 521

(56) References Cited

U.S. PATENT DOCUMENTS

| | | | |
|---|---|---|---|
| 5,274,834 | * | 12/1993 | Kardach et al. ..................... 710/260 |
| 5,357,628 | * | 10/1994 | Yuen ....................................... 714/34 |
| 5,630,147 | * | 5/1997 | Datta et al. ........................... 713/300 |
| 5,638,532 | * | 6/1997 | Frame et al. .......................... 711/154 |
| 5,729,760 | * | 3/1998 | Poisner ..................................... 710/3 |
| 5,745,770 | * | 4/1998 | Thangadurai et al. ............... 710/260 |
| 5,909,696 | * | 6/1999 | Reinhardt et al. .................... 711/144 |
| 5,933,614 | * | 8/1999 | Tavallaei et al. ..................... 710/129 |
| 5,978,903 | * | 11/1999 | Quimby et al. ....................... 712/229 |
| 6,093,213 | * | 7/2000 | Favor et al. ............................. 703/27 |

OTHER PUBLICATIONS

Intel, Intel 440LX AGP Set: 84443LX PCI A.G.P. Controller (PAC), Intel Corp.; pp 2, 8, 21–25, 30–32, 47–48 & 55–82, Jan. 1998.*

* cited by examiner

Primary Examiner—Eddie P. Chan
Assistant Examiner—Hong Kim
(74) Attorney, Agent, or Firm—Blakely, Sokoloff, Taylor & Zafman LLP

(57) ABSTRACT

A method for preventing access to a system management random access memory (SMRAM) space is disclosed. The method intercepts access to an accelerated graphics port (AGP) aperture memory space and re-directs the access to non-SMRAM space if the access is directed to the SMRAM space.

19 Claims, 8 Drawing Sheets

APPARATUS AND METHOD FOR PREVENTING ACCESS TO SMRAM SPACE THROUGH AGP ADDRESSING

BACKGROUND OF THE INVENTION (1) Field of the Invention

The field of the invention is prevention of unauthorized access to protected memory space, more specifically, the present invention is a method and apparatus for preventing access to protected system management random access memory (SMRAM) space through accelerated graphics port (AGP) address translation into the SMRAM space.

(2) Related Art

System management random access memory (SMRAM) is a secure memory address space in a system memory of a computer system which stores processor status and system management interrupt (SMI) handlers. SMI handlers are software routines which perform various system management functions including system power control. The SMRAM is reserved for proprietary processing including processing of code used to update a basic input output system (BIOS) device. The BIOS device is responsible for booting a computer by providing a basic set of instructions and performing system start-up tasks. The BIOS device also provides an interface to the underlying hardware for the operating system in the form of a library of interrupt handlers.

A computer system may also have an accelerated graphics port (AGP) aperture memory reserved for use by a graphics device for graphics data processing. Currently, to access the AGP aperture memory, a programmer can write an AGP aperture memory address and an SMRAM page number as a corresponding address into a translation table having AGP aperture address to main memory address translation entries. Since the main memory address of the page is actually in the SMRAM space and not in the AGP aperture memory, the translation process redirects the request to the protected SMRAM region in main memory.

If the SMRAM space is accessed by a user, an unauthorized user is able to corrupt the BIOS in a manner which would disable the system and prevent the system from booting in the future until the BIOS is replaced. Other disadvantages of leaving the SMRAM space accessible to users include but are not limited to allowing users to view proprietary code for reverse engineering purposes.

It is therefore desirable to have a method and apparatus which prevents access to the protected SMRAM space through AGP address translation into the SMRAM space.

BRIEF SUMMARY OF THE INVENTION

A method for preventing access to a system management random access memory (SMRAM) space is disclosed. The method intercepts access to an accelerated graphics port (AGP) aperture memory space and re-directs the access to non-SMRAM space if the access is directed to the SMRAM space.

DETAILED DESCRIPTION OF THE INVENTION

The present invention is a mechanism for preventing end-users from reading or altering code in a protected system management random access memory (SMRAM) space. SMRAM is a secure memory address space that stores processor status and system management interrupt (SMI) handlers. Additionally, the code used to update the basic input output system (BIOS) device are executed from the SMRAM space. The present invention prevents users from using the accelerated graphics port (AGP) aperture memory translation process to gain access to the protected SMRAM space. An AGP aperture memory is a portion of the system memory reserved for use by a graphics device for graphics data processing.

Figure 1:
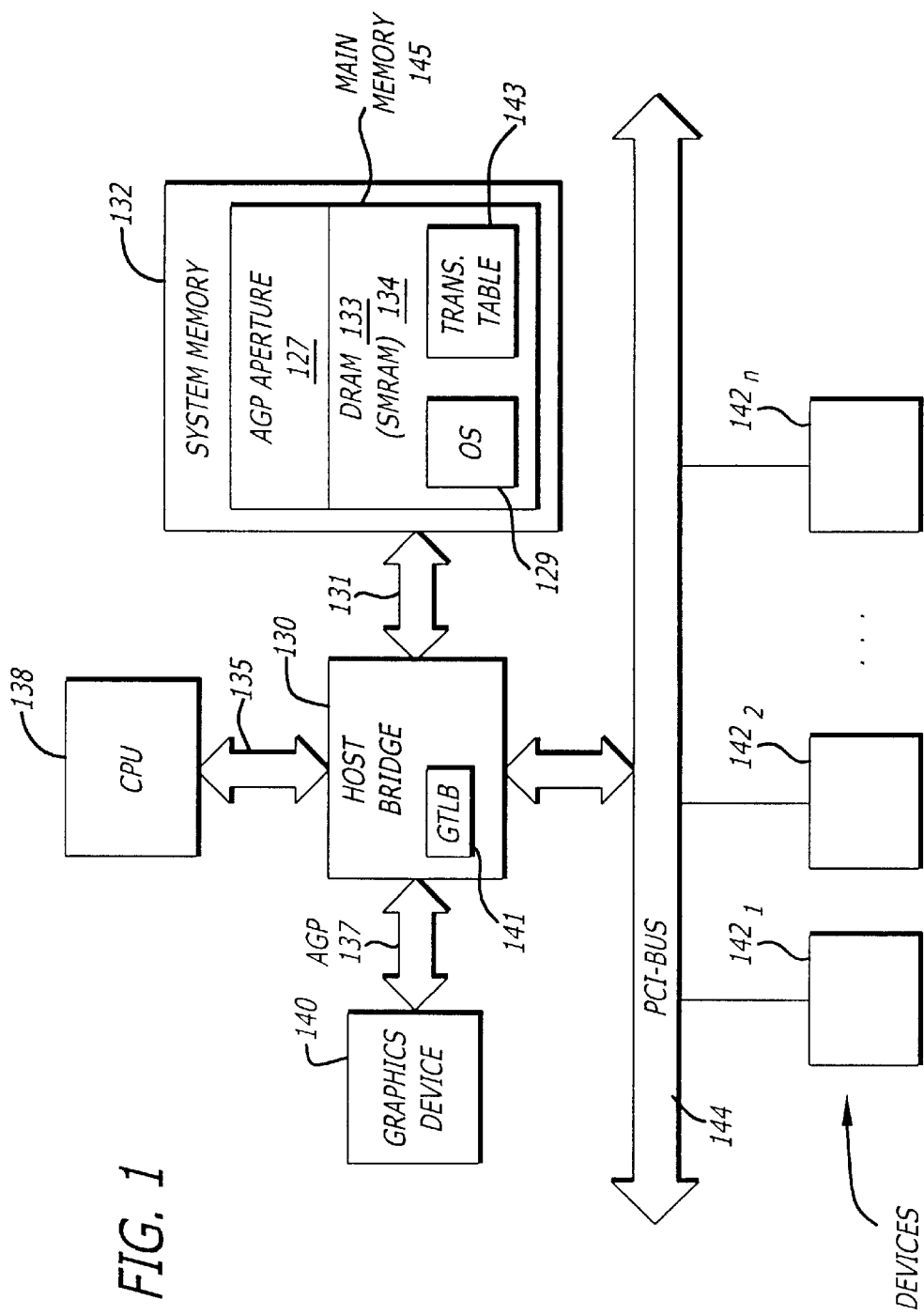
FIG. 1 is an exemplary system block diagram illustrating one embodiment of a computer system with an SMRAM space and an implementation of the present invention for protecting the SMRAM space.

FIG. 1 illustrates an exemplary block diagram of a computer system which may be implemented with the present invention's mechanism for preventing access to protected SMRAM space. In one embodiment, a host bridge 130 is coupled to a system memory 132 by a bus 131.

The system memory 132 has a main memory 145 with a dynamic random access memory (DRAM) 133. A portion of the DRAM 133 is configured as a system management random access memory (SMRAM) space 134. An accelerated graphics port (AGP) aperture memory 127 is part of the system memory 132 which is reserved for use by an accelerated graphics port (AGP) device 140 (also referred herein as a graphics device 140). The system memory 132 also has a translation table 143 with a virtual to main memory address translation for the AGP aperture memory 127 access requests to the system memory 132.

Additionally, an operating system (OS) 129 which controls the execution of programs and which may provide services such as resource allocation, scheduling, input/output control, and data management resides in the system memory 132. In one embodiment, the operating system 129 may be software implemented. In another embodiment, the operating system 129 may be partially implemented with hardware.

The host bridge 130 couples the system memory 132 to various devices including a central processing unit (CPU) 138 such as an Intel Pentium® II processor coupled by a bus 135, a graphics device 140 coupled by an accelerated graphics port (AGP) 137, and a plurality of peripheral component interconnect (PCI) devices $142_1$ through $142_N$ coupled by a bus 144. The host bridge 130 has a graphics translation lookaside buffer (GTLB) 141 which is a cache buffer of the translation table 143 having a predetermined number of virtual to main memory address translation for use in translating addresses for AGP aperture memory 127 access requests to the system memory 132.

The PCI devices $142_1$ through $142_N$ are Input/Output (I/O) hardware devices that are coupled to the system through a PCI expansion connector (not shown) or mounted to the personal computer (PC) motherboard (not shown). Examples of PCI or other I/O devices include, but are not limited to a graphics controller/card, a disk controller/card, a local area network (LAN) controller/card and a video controller/card.

In another embodiment, the host bridge 130 has one or more bus (e.g., PCI bus) controller, a graphics (e.g., AGP) controller, a CPU controller and a memory controller to control data access between various components such as, for example, a bus and the graphics device 140, the system memory 132 and the CPU 138. Although not shown, a person skilled in the art may appreciate that the system may also include various other components typically found in a computer system.

The present invention prevents unauthorized accesses to the SMRAM 134 space by detecting access requests to the SMRAM 134 space. More specifically, when an access request to the DRAM 133 in the system memory 132 misses any entries in a graphics translation lookaside buffer (GTLB) 141, an address reference is fetched from the translation table 143 in the system memory 132. When the fetch occurs, the address reference fetched is compared with the SMRAM 134 address range in the host bridge 130. The comparison is made to determine whether the address reference is within the SMRAM 134 space.

The address reference is used for the access only if the address reference is not found to be in the SMRAM 134 space. If the address reference is found to be in the SMRAM 134 space, then a fixed value (such as all 1's) which cannot hit the SMRAM 134 space is used as the address for the access request in order to prevent unauthorized users from accessing the protected SMRAM 134 space. In both cases, the address reference is stored in the GTLB 141 for future access request translation.

Figure 2A:
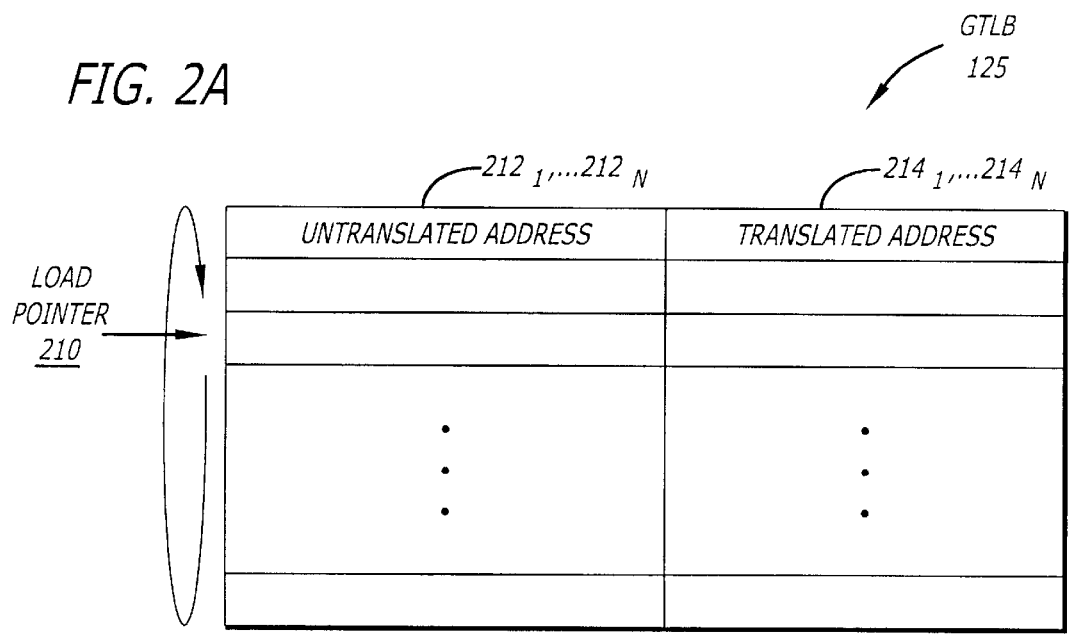
FIG. 2a illustrates one embodiment of the present invention's graphics translation lookaside buffer (GTLB).

FIG. 2a illustrates an exemplary graphic translation lookaside buffer (GTLB). In one embodiment, the GTLB 141 has a rotating load pointer 210 which points to one entry in the GTLB 141 at any given time. The GTLB 141 also has pre-translated (untranslated) addresses $212_1 \ldots 212_N$ and the corresponding translated addresses $214_1 \ldots 214_N$.

Figure 2B:
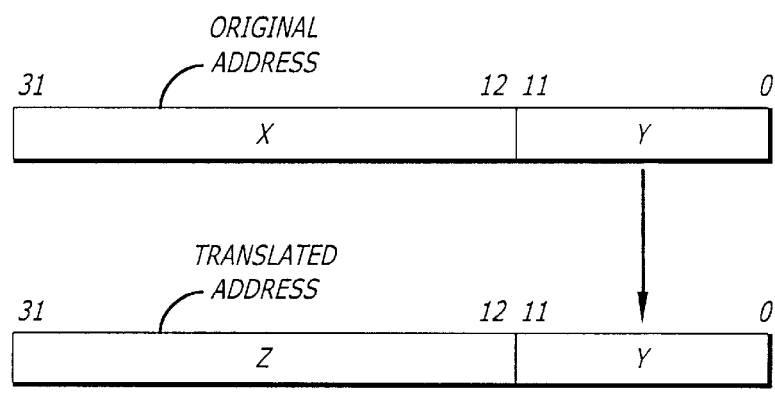
FIG. 2b illustrates an exemplary original address and it's corresponding exemplary translated address.

FIG. 2b illustrates an exemplary pre-translated (untranslated) address and it's corresponding exemplary translated address. X is an AGP aperture memory 127 address which is translated to a corresponding main memory 145 address Z. In one embodiment, the translation maps only the first 4K block of the AGP aperture memory 127 address to a corresponding 4K block in a main memory 145. The Y therefore represents lower bits which are not affected by translation.

The translation is performed off the GTLB 141 residing in the host bridge 130 which is a cache buffer of the translation table 143 residing in the system memory 132. If there is a GTLB 141 miss (i.e. a main memory 145 address Z is not found for an address X for an AGP aperture memory 127 access request in the GTLB 141), then the translation is performed off the translation table 134 in the system memory 132 and the GTLB 141 is updated with the corresponding entry in the translation table 134 for future translation use.

Figure 2C:
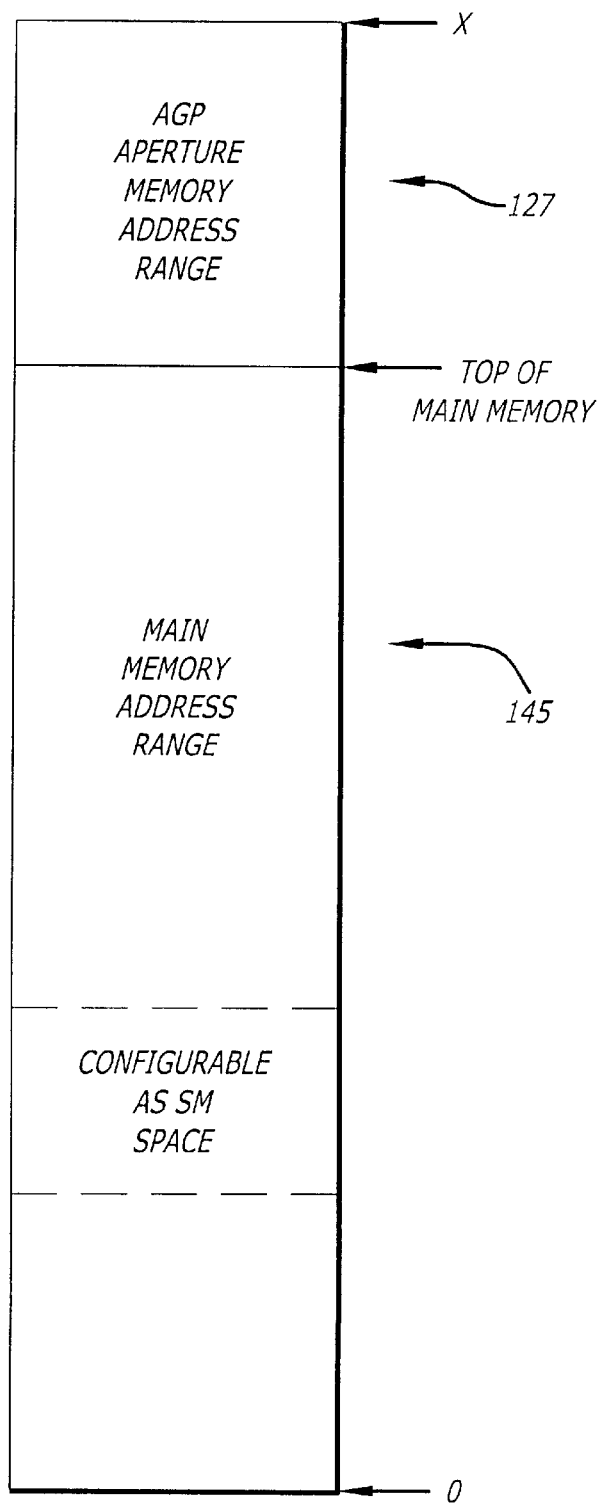
FIG. 2c is an exemplary system memory address map.

FIG. 2c illustrates an exemplary system memory address map. In one embodiment, the system memory 132 has a main memory address range from address 0 (zero) to the top of the main memory 145. The main memory 145 address space maps into the physical address space of the system memory 132. The AGP aperture memory 127 address range begins from the top of the main memory 145. The AGP aperture memory 127 is a virtual memory and maps into the physical address space of the main memory 145 as illustrated in FIG. 2d.

Figure 2D:
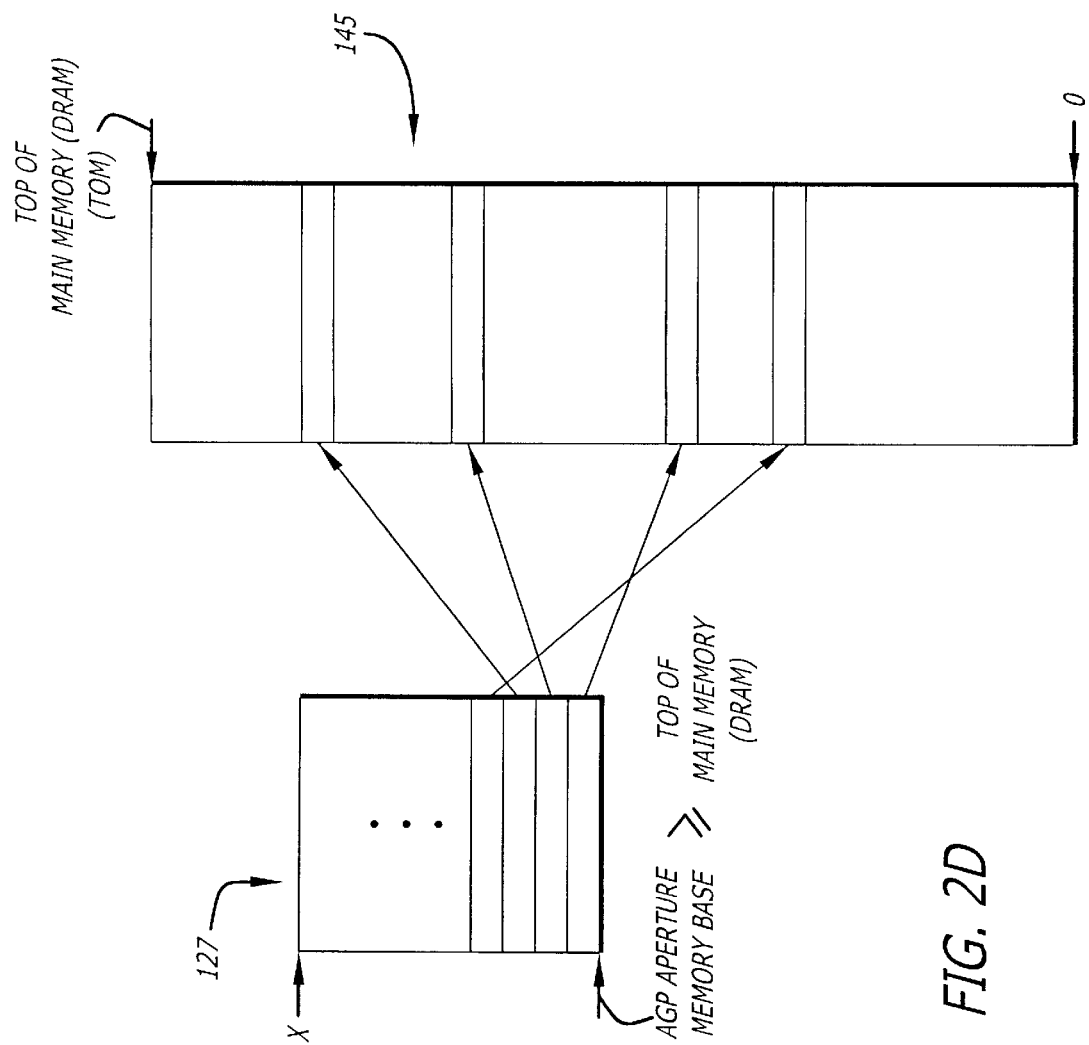
FIG. 2d illustrates exemplary AGP aperture memory address range references to corresponding main memory address range.

FIG. 2d illustrates exemplary references from the AGP aperture memory space to the main memory space.

The AGP aperture memory 127 is a portion of the system memory 132 which is allocated by the operating system 129 for use by the graphics device 140. The graphics device 140 is provided with the reserved memory portion to store texture data, front buffer data or other graphics data for faster graphics data processing.

The AGP aperture memory 127 is a virtual memory. Each address of the AGP aperture memory 127 has a corresponding entry in the main memory 145 mapped into the physical address space of the system memory 132.

The operating system 129 is able to point to pages in the main memory 145 of the system memory 132 wherever they are found and assigns them for the graphics device 140. The graphics device 140 is therefore provided with a continuous block of AGP aperture memory 127 and references from the AGP aperture memory 127 points to various locations in the main memory 145 as illustrated in FIG. 2d.

In one embodiment, the AGP aperture memory 127 addresses begin from the address space above the top of the main memory 145 in the system memory 132. For example, if there are 512 megabytes of main memory 145, the AGP aperture memory 127 may start anywhere at 512 megabytes or at a higher address.

In one embodiment, the main memory 145 is mapped in 4K pages and each page in the AGP aperture memory 127 is directed to some address space in the main memory 145. All the references pointing from the AGP aperture memory 127 address to a corresponding address in the main memory 145 are stored in the translation table 143 in the system memory 132. In one embodiment, each 8 byte worth of the system memory 132 has two entries in the translation table 143. In one embodiment, each entry in the translation table 143 has address bits which are able to indicate when an address is written to the entry.

The GTLB 141 located in the host bridge 130 is a cache buffer of the translation table 143. A predetermined number of the most recently allocated entries may be kept in the GTLB 141. The GTLB 141 has address references from the AGP aperture memory 127 to a corresponding address in the main memory 145 of the system memory 132. In one embodiment, the entry that has been in the GTLB 141 the longest is the first to be replaced by a new entry. Various other implementations of the GTLB 141 may be readily understood by a person skilled in the art.

Figure 3:
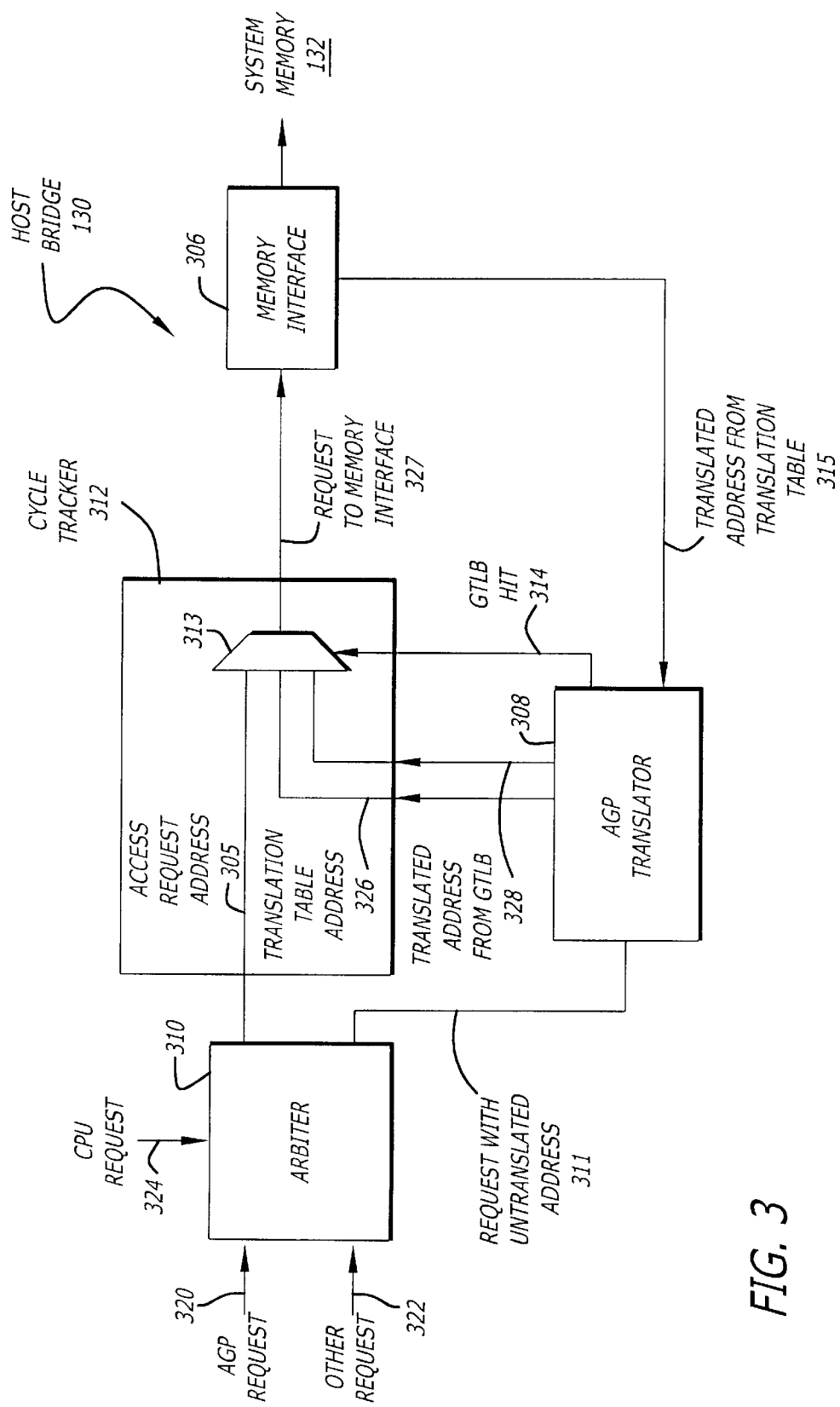
FIG. 3 is a block diagram illustrating one embodiment of the present invention implemented in the host bridge illustrated in FIG. 1.

FIG. 3 is a block diagram illustrating one embodiment of the present invention implemented in the host bridge illustrated in FIG. 1.

A request to access the system memory 132 is forwarded to the host bridge 130 by various devices. For example, a CPU request 324 may be made by the processor 138, an AGP request 320 is a request made by the graphics device 140 and requests 322 may be made by other devices. In one embodiment, a request is configured with a destination address where a read or a write is to be directed to. The destination address refers to some address location in the system memory 132. The AGP aperture memory 127 destination address is a virtual address requiring a virtual to main memory 145 address translation.

If the request's destination address needs no translation, then an arbiter 310 of the host bridge 130 forwards the access request and address 305 to the cycle tracker 312. Otherwise, if the request is to the AGP aperture memory 127 and is therefore with an untranslated address, then the arbiter 310 forwards the request to an AGP translator 308.

The AGP translator 308 looks up the GTLB 141 in the host bridge 130 to search for a corresponding main memory 145 address. If a corresponding main memory 145 address is in the GTLB 141, then the AGP translator 308 translates the AGP aperture memory 127 address of the request to the corresponding main memory 145 address. The process by which an address in a virtual memory is translated to its corresponding physical memory address is well known in the art and needs no further discussion.

If a corresponding address is not in the GTLB 141, then the AGP translator 308 determines a corresponding translation table 143 address for the request. In one embodiment, the corresponding translation table 143 address may be determined by the number of address entries the AGP aperture memory 127 address for the request is from the aperture base of the AGP aperture memory 127. For example, if the aperture base is X and the request is to aperture base +34K, then the address of the translation table 143 where the corresponding main memory 145 address is located may be determined as X+20h. 20h is in hexadecimal representation. The translation table 143 address is determined to be X+20h because 34K is in the 9th 4K page in the AGP aperture memory 127 and +20h increments from the 32 bit entry 0 to the 32 bit entry 8.

The AGP translator 308 then provides the cycle tracker 312 with a GTLB hit signal 314 indicating whether there is a GTLB hit for the AGP request (i.e. the GTLB 141 has a main memory 145 address for the AGP request), a corresponding translated address 328 from the GTLB 141 if there is a GTLB hit, and a translation table address 326 if there is no GTLB hit. The cycle tracker 304 then forwards the request along with its corresponding address to a memory interface 306 on a data path 327.

A redirection occurs when the AGP address in the request selected by the arbiter 310 is replaced with the address from the AGP translator 308. If there was a GTLB hit, then the translated address 328 is used to re-direct the request to the main memory 145 in the system memory 132. If there was no GTLB hit, then the cycle tracker 312 forwards the request along with a translation table address 326 to the memory interface 306. The memory interface 306 re-directs the request to a corresponding translation table 143 address in a translation table 143 in the system memory 132 to fetch the corresponding main memory 145 address. The main memory 145 address fetched from the translation table 143 is forwarded to the AGP translator 308. The AGP translator 308 receives the translated address 315 and determines whether the translated address 315 is within the SMRAM address range. If the translated address 315 is not within the SMRAM address range, then the GTLB 141 is updated with a new translation entry having the request address 311 and the corresponding translated address 315. Otherwise, the translated address 315 is converted to a non-SMRAM address.

Figure 4:
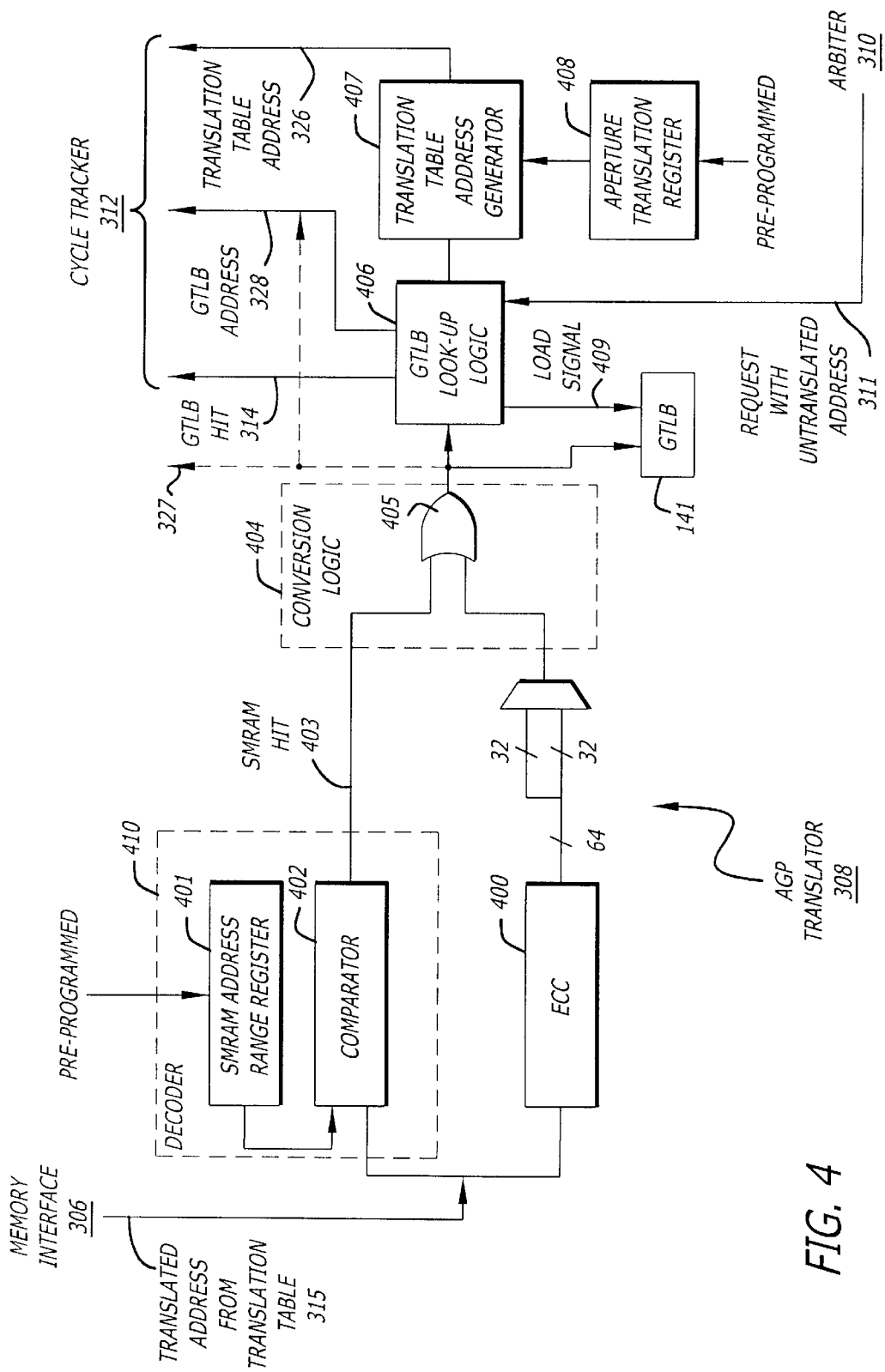
FIG. 4 is a block diagram of one embodiment of the AGP translator illustrated in FIG. 3.

FIG. 4 is a block diagram of one embodiment of the AGP translator illustrated in FIG. 3. As was described above, an access request to the system memory 132 which has an untranslated destination address 311 is input to the AGP translator 308 for translation. A GTLB look-up logic 406 of the AGP translator 308 receives the request with the untranslated address 311 from the arbiter 310 and performs a look-up to the GTLB 141 for an entry with a corresponding translated address. If a corresponding translated address is found in the GTLB 141, then the GTLB look-up logic 406 asserts a GTLB hit 314 and outputs the translated address 328 from the GTLB 141 to the cycle tracker 312. The cycle tracker 312 forwards the request with the corresponding translated address 328 to the memory interface 306 on the data path 327 for access to the system memory 132.

Otherwise, if a corresponding translated address is not found in the GTLB 141, there is a GTLB miss and the request 311 is forwarded to a translation table address generator 407. The translation table address generator 407 retrieves a translation table address 326 corresponding to the AGP aperture memory 127 address of the request from an aperture translation register 408 and forwards the translation table address 326 to the cycle tracker 312. The cycle tracker 312 forwards the request along with the translation table address 326 to the memory interface 306 to fetch a translated address 315. The translated address 315 is fetched at the entry address in the translation table 143 designated by the translation table address 326 and forwarded to the AGP translator 308.

The translated address 315 is decoded by a decoder 410. A comparator 410 of the decoder 410 determines if there is an SMRAM hit. In one embodiment, the SMRAM hit is determined through a "greater than" and a "less than" compare with SMRAM address boundaries indicated in a SMRAM address range register 401. At the same time that the translated address 315 is decoded, the translated address 315 is also checked through an error checking and correction (ECC) block 400. The use of an ECC to check for data errors is well known in the art and needs no further discussion.

If there is an SMRAM hit, then the translated address 315 is converted to a fixed value (such as all 1's) which cannot hit the SMRAM space 134. The conversion is performed by a conversion logic 410 to avoid directing the request to the SMRAM space 134. The SMRAM hit 403's output is high if there is an SMRAM hit. In one embodiment, the high output of the SMRAM hit 403 is processed through an OR gate 405 which converts the translated address 315 into all 1's which cannot hit the SMRAM space 134.

The GTLB look-up logic 406 asserts a load signal 409 and the output from the conversion logic 404 is stored in the GTLB 141 as a new translation address entry. The GTLB look-up logic 406 also asserts the GTLB hit 314 and forwards the converted address to the cycle tracker 312 through the GTLB address 328 line. The cycle tracker 312 forwards the translated address 328 to the memory interface 306 through the data path 327 to direct the request to the system memory 132.

In an alternate embodiment, the converted translated address is forwarded to the cycle tracker 312 through the GTLB address 328 line or on a separate line 327 at the same time as the converted translated address is forwarded to the GTLB look-up logic 406 for updating the GTLB 141 with the converted translated address. The alternate embodiment minimizes latency in forwarding the converted translated address to the cycle tracker 312.

In this way, AGP requests to the system memory 132 directed to the SMRAM 134 space are re-directed to prevent unauthorized access to the protected SMRAM 134 space.

Figure 5A:
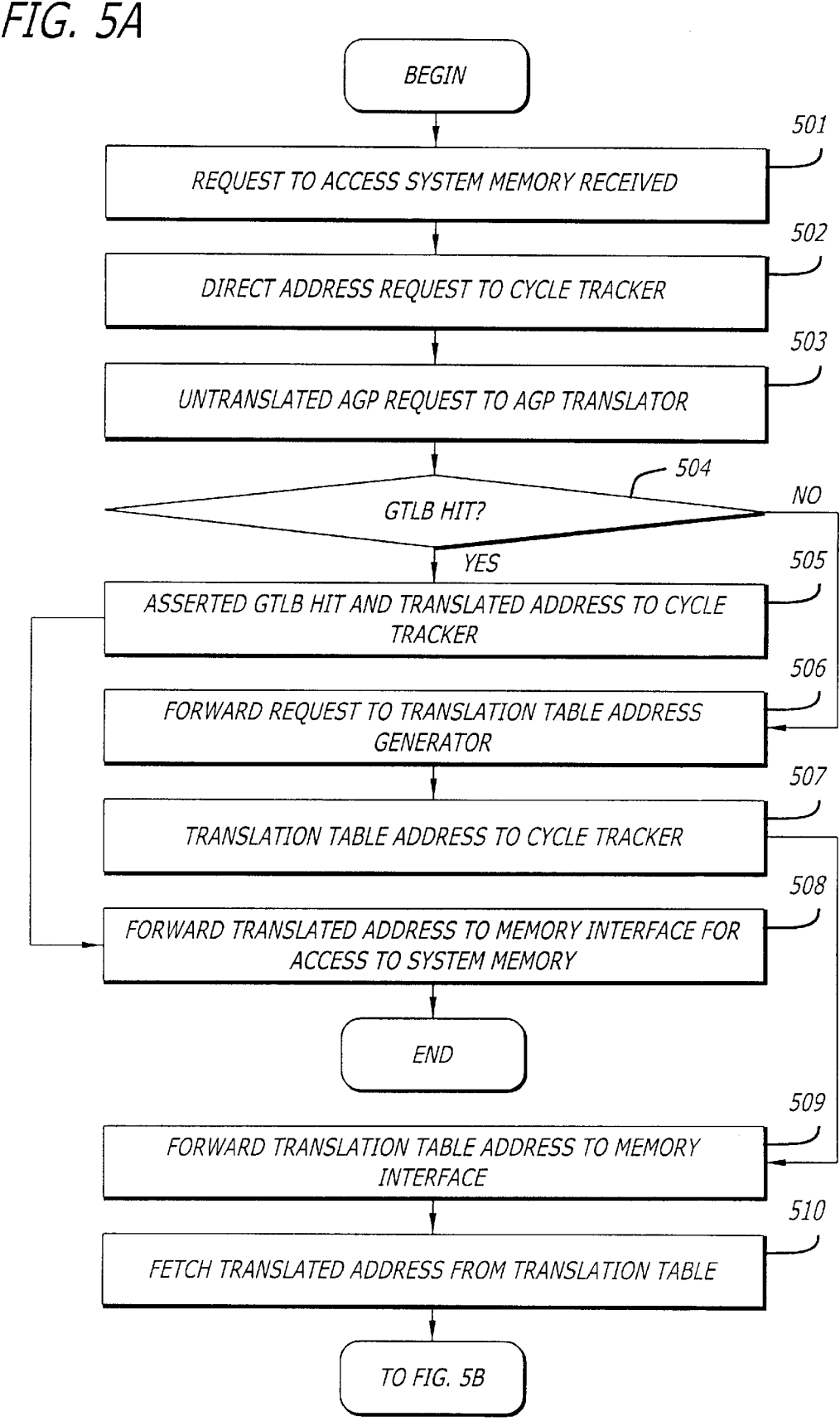
FIGS. 5a and 5b are flow diagrams illustrating the general steps followed by one embodiment of the present invention's mechanism for preventing access to protected SMRAM space.
Figure 5B:
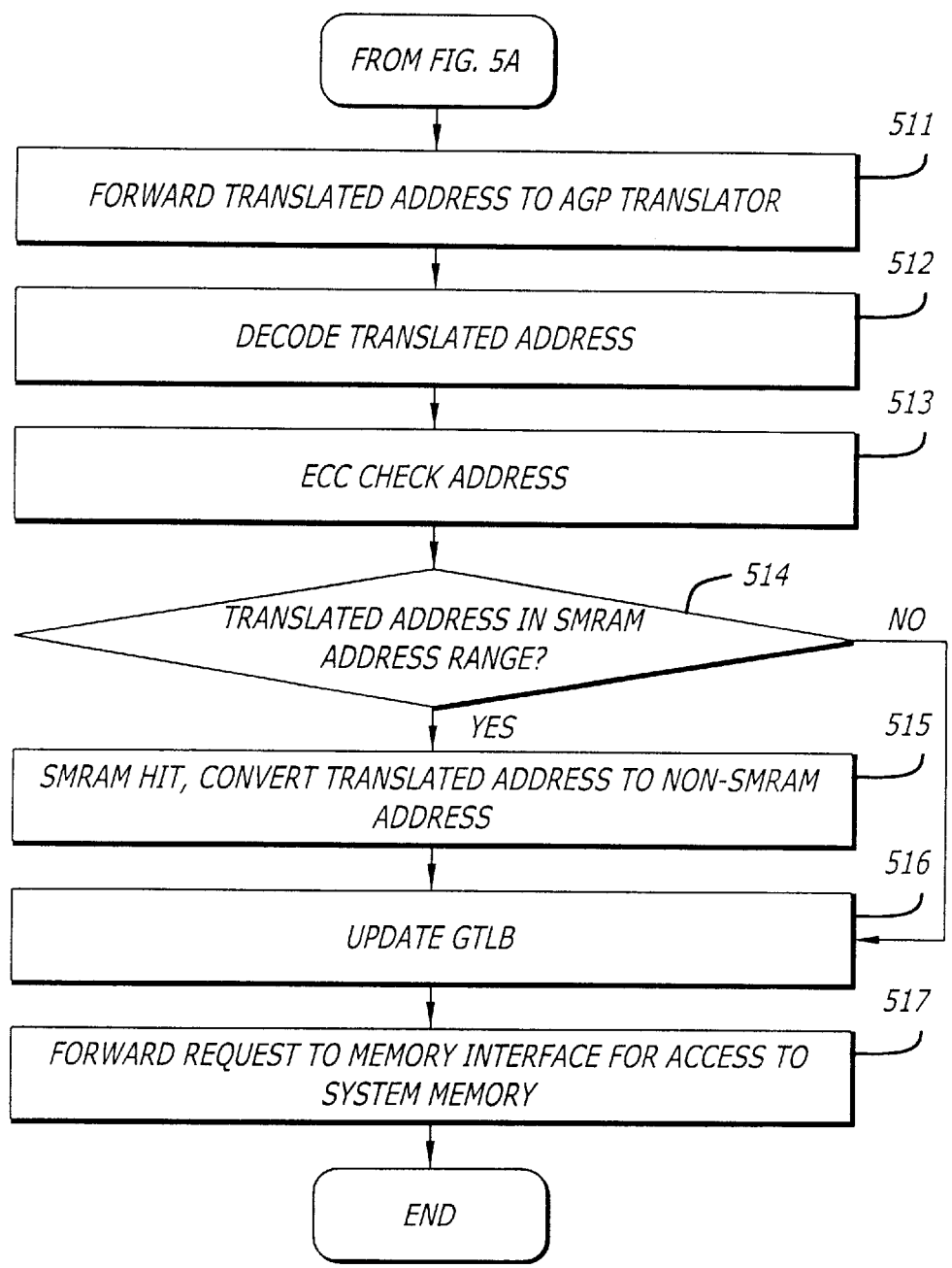

FIGS. 5*a* and 5*b* are flow diagrams illustrating the general steps followed by one embodiment of the present invention's mechanism for preventing access to protected SMRAM space. In step 501, a request to access the system memory 132 is forwarded to the host bridge 130 along with a request address specifying the address in the system memory 132 to be accessed. In step 502, requests with direct destination addresses which do not need translation are forwarded to the cycle tracker 312.

In step 503, the arbiter 310 of the host bridge 130 forwards requests with an untranslated address to the AGP translator 308. In step 504, the GTLB look up logic 406 of the AGP translator 308 receives a request with an untranslated address and looks up the GTLB 141 to determine whether the GTLB 141 has an entry having a translated main memory 145 address corresponding to the untranslated address. In step 505, if the GTLB 141 has an entry having a translated main memory 145 address corresponding to the request address, then there is a GTLB hit. The translated main memory 145 address which is the translated address 328 from the GTLB 141 and an asserted GTLB hit signal 314 is input to the cycle tracker 312 by the GTLB look up logic 406.

Otherwise in step 506, the request is forwarded to a translation table address generator 407 which performs a look up to an aperture translation table register 408 entry corresponding to the request address and generates a corresponding translation table address 326. In step 507, the translation table address 326 is then forwarded to the cycle tracker 312 by the translation table address generator 407. In this way, the AGP translator 308 provides the cycle tracker 312 with a GTLB hit signal 314 indicating whether there was a GTLB hit for the access request, a translated address 328 from the GTLB 141 if there was a GTLB hit, and a translation table address 326 if there was no GTLB hit.

In step 508, if there was a GTLB hit, then the cycle tracker 312 forwards the request along with the translated address 328 from the GTLB 141 to a memory interface 306 which directs the request to the system memory 132.

Otherwise, in step 509, if there is no GTLB hit, the cycle tracker 312 forwards the request along with the translation table address 326 to the memory interface 306. In step 510, the memory interface 306 directs the translation table address 326 to the translation table 143 and fetches the corresponding main memory 145 address in the translation table 143. In step 511, the data fetched from the main memory 145 address is forwarded to the AGP translator 308 as a translated address 315 from the translation table 143. In step 512, the translated address 315 is decoded by a decoder 410 which performs a look up to an SMRAM address range register 401 to determine if the translated address 315 is within the SMRAM address range in the system memory 132.

In step 513, at the same time that the translated address 315 is decoded, the translated address 315 is also checked through an error checking and correction (ECC) block 400. In step 514, if the translated address 315 is within the SMRAM address range, then in step 515 there is an SMRAM hit. The SMRAM hit 403 is asserted high. The conversion logic 404 converts the translated address 315 to a fixed value (such as all 1's) which cannot hit the SMRAM to avoid directing the request to the SMRAM space 134. In one embodiment, the conversion is performed by an OR gate 405 which accepts the SMRAM hit 403's output which is asserted high and outputs an address of all 1's. In step 516, the GTLB 141 is updated with the output address from the conversion logic 404. In step 517, the request is re-directed to a non-SMRAM space main memory 145 address by the memory interface 306.

What has been described is a method and apparatus for preventing unauthorized users from reading or altering code in a protected system management random-access memory (SMRAM) space.

While certain exemplary embodiments have been described in detail and shown in the accompanying drawings, it is to be understood that such embodiments are merely illustrative of and not restrictive on the broad invention, and that this invention is not to be limited to the specific arrangements and constructions shown and described, since various other modifications may occur to those with ordinary skill in the art.

What is claimed:

1. A method for preventing access to a system management random access memory (SMRAM) space of a system memory comprising:
   receiving a memory access request through an accelerated graphics port (AGP requesting data from said system memory;
   determining whether said memory access request is directed at data in said SMRAM memory by performing a look up in a GTLB for an entry with said translated address corresponding to said untranslated access address, and by performing a look up to a translation table register for an entry with a translation table address corresponding to said untranslated access address if said GTLB does not have an entry with said translated address corresponding to said untranslated access address; and
   accessing data from a non-SMRAM space if said memory access request is directed at data in said SMRAM space.

2. The method of claim 1 further comprising preprogramming said translation table register by calculating increments from the base of an aperture memory to the desired length of said aperture memory to which said untransaled access address is directed.

3. The method of claim 2 further comprising preprogramming a system management random access memory (SMRAM) address range register having an SMRAM address range in said system memory.

4. The method of claim 1 further comprising performing access to said system memory using said translated address if said GTLB has an entry with said translated address corresponding to said untranslated access address.

5. The method of claim 1 further comprising performing a look up to the entry corresponding to said translation table address in said translation table in said system memory to retrieve said translated address corresponding to said untranslated access address in said entry.

6. The method of claim 5 further comprising performing a look up to said SMRAM address range register to determine if said translated address is within said SMRAM address range.

7. The method of claim 6 further comprising performing an access to said system memory using said translated address if said translated address is not within said SMRAM address range.

8. The method of claim 7 further comprising converting said translated address to a non-SMRAM address if said translated address is within said SMRAM address range.

9. An apparatus comprising:
   an accelerated graphics port (AGP) translator configured to translate an untranlated access address to a corresponding translated address directed to a system memory, said untransalated access address corresponding to a request to access said system memory;

a decoder coupled to said AGP translator and configured to determine if said translated address is within an SMRAM address range, said request being re-directed to a non-SMRAM address if said translated address is within said SMRAM address range;

translation table configured to store a plurality of entries with a translation table address and a corresponding translated address; and a graphics translation lookaside buffer (GTLB) configured to store a plurality of entries with a untranslated access address and a corresponding translated address, said GTLB is a cache buffer of said translation table;

wherein said AGP translator comprises a translation table address generator coupled to a translation table register and configured to perform a look up to said translation table register for an entry with a translation table address corresponding to said untranslated access address if said GTLB does not have an entry with said translated address corresponding to said untranslated access address.

10. The apparatus of claim 9 further comprising a system management random access memory (SMRAM) address range register having an SMRAM address range.

11. The apparatus of claim 10 further comprising a memory interface configured to perform access to said system memory using said translated address if said GTLB has an entry with said translated address corresponding to said untranslated access address.

12. An apparatus comprising:

an accelerated graphics port (AGP) translator configured to translate an untranlated access address to a corresponding translated address directed to a system memory, said untranslated access address corresponding to a request to access said system memory;

a decoder coupled to said AGP translator and configured to determine if said translated address is within an SMRAM address range, said request being re-directed to a non-SMRAM address if said translated address is within said SMRAM address range;

translation table configured to store a plurality of entries with a translation table address and a corresponding translated address; and a graphics translation lookaside buffer (GTLB) configured to store a plurality of entries with a untranslated access address and a corresponding translated address, said GTLB is a cache buffer of said translation table;

a system management random access memory (SMRAM) address range register having an SMRAM address range; and a memory interface configured to perform access to said system memory using said translated address if said GTLB has an entry with said translated address corresponding to said untranslated access address, wherein said memory interface is further configured to fetch the entry corresponding to said translation table address in said translation table in said system memory to retrieve said translated address corresponding to said untranslated access address in said entry, said memory interface is further configured to perform an access to said system memory using said translated address if said translated address is not within said SMRAM address range.

13. The apparatus of claim 12 wherein said decoder is coupled to said SMRAM address range register and further configured to perform a look up to said SMRAM address range register to determine if said translated address is within said SMRAM address range.

14. The apparatus of claim 13 further comprising a conversion logic coupled to said decoder and configured to convert said translated address to a converted address if said translated address is within said SMRAM address range, said converted address directed to non-SMRAM space.

15. A system comprising:

a system memory comprising a translation table configured to store a plurality of entries with a translation table address and a corresponding translated address; and a host bridge coupled to said system memory comprising,
an accelerated graphics port (AGP) translator configured to translate an untranslated access address to a corresponding translated address directed to a system memory, wherein said AGP translator comprises a translation table address generator coupled to a GTLB look-up logic and configured to perform a look up to a translation table register for an entry with a translation table address corresponding to said untranslated access address if said GTLB does not have an entry with said translated address corresponding to said untranslated access address; and
a decoder coupled to said AGP translator and configured to determine if said translated address is within an SMRAM address range, said request being re-directed to a non-SMRAM address if said translated address is within said SMRAM address range.

16. The system of claim 15 further comprising a memory interface configured to perform access to said system memory using said translated address if said GTLB has an entry with said translated address corresponding to said untranslated access address.

17. The system of claim 16 wherein said memory interface is further configured to perform a look up to the entry corresponding to said translation table address in said translation table in said system memory to retrieve said translated address corresponding to said untranslated access address in said entry and to perform an access to said system memory using said translated address if said translated address in not within said SMRAM address range.

18. The system of claim 15 wherein said decoder is coupled to an SMRAM address range register, said SMRAM address range register pre-programmed to hold an SMRAM address range, said decoder is further configured to perform a look up to said SMRAM address range register to determine if said translated address is within said SMRAM address range.

19. The system of claim 18 further comprising a conversion logic configured to convert said translated address to a converted address if said translated address is within said SMRAM address range, said converted address directed to non-SMRAM space.

* * * * *